(No Model.)

L. KOSS.
REVERSIBLE TRAVERSING MOVEMENT.

No. 520,827. Patented June 5, 1894.

Witnesses
Edward E. Paddock
C.F.R. Wappenhans

Inventor
Louis Koss
By his Attorney
Thompson & Bell

UNITED STATES PATENT OFFICE.

LOUIS KOSS, OF INDIANAPOLIS, INDIANA.

REVERSIBLE TRAVERSING MOVEMENT.

SPECIFICATION forming part of Letters Patent No. 520,827, dated June 5, 1894.

Application filed August 22, 1893. Serial No. 483,775. (No model.)

*To all whom it may concern:*

Be it known that I, LOUIS KOSS, a citizen of the United States, residing at Indianapolis, in the county of Marion and State of Indiana, have invented new and useful Improvements in Automatic Reversible Traversing Movements, of which the following is a specification.

My invention relates to a new and improved mechanical movement which is designed for use in connection with traversing carriages or other similarly operated traversing pieces of emery grinding or other machines, and consists in a trip engaging and traversing mechanism hereinafter more fully set forth.

The object of my invention is to provide a simple, cheap, and durable trip mechanism in connection with an endless traversing chain which, by suitable engaging grips or catches, will automatically engage and disengage said chain to reverse the direction of the motion of the traversing carriage or piece to which it is connected. I attain this object by means of the mechanism illustrated in the accompanying drawings in which similar numbers of reference designate like parts throughout both the views.

Figure 1:
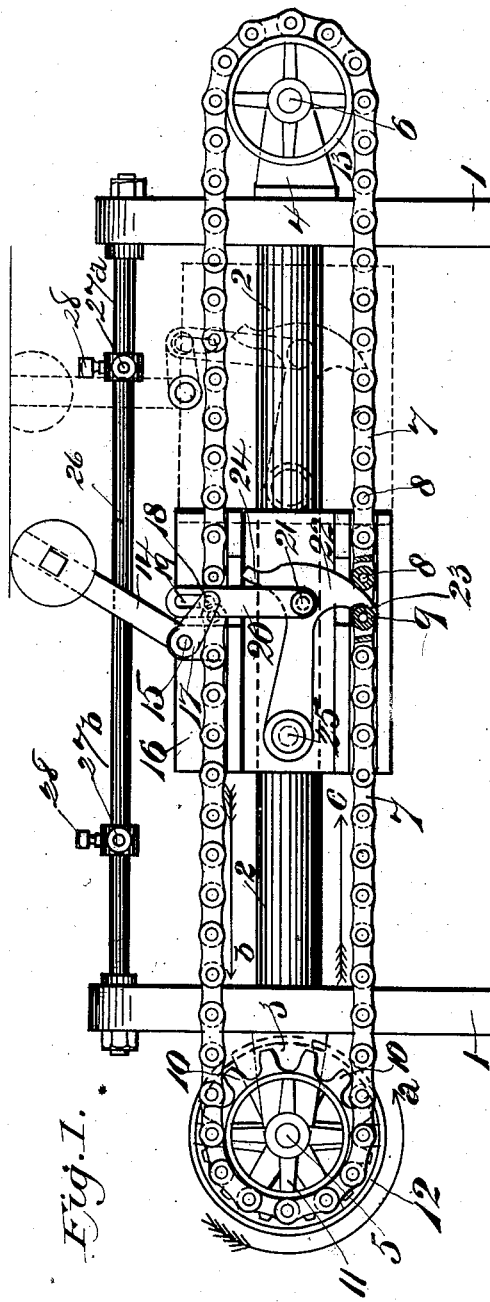
Figure 2:
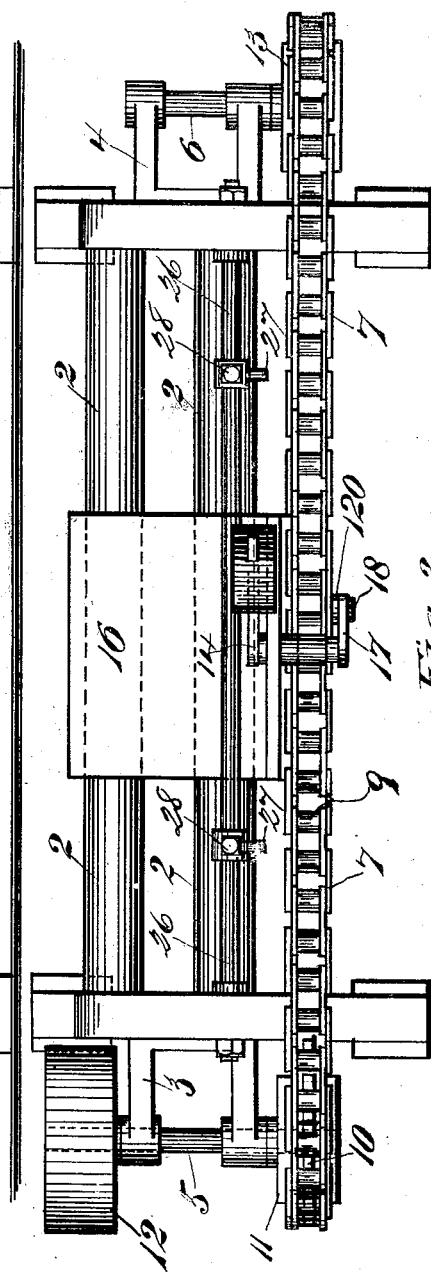

Figure 1. is a front elevation of the apparatus; and, Fig. 2. is a plan of the same.

The end frames 1. are firmly connected together by the guide pieces 2, which are firmly secured at their ends to said frames by a bolt or other suitable securing device. On the ends of the frames 1. are secured rigidly the brackets 3. and 4. in which are journaled the shafts 5. and 6. The endless traversing chain 7. is of the pin-plate type, and between the plates of which are journaled the rollers 9, on the rivets 8, by which said plates are united together to form a joint. The rollers 9 are of a sufficient length to form a space between the plates of the chain to permit the free entrance of the teeth 10, of the sprocket wheel 11. whereby the endless chain 7. is driven.

The sprocket wheel 11. is firmly secured on the driving shaft 5, or there may be an intermediate train of reducing gears between said driving shaft and a shaft on which said sprocket is secured for the purpose of producing a slow traversing motion of the traversing chain 7. The shaft 5. is driven by means of a suitable driving belt on the pulley 12. which is also firmly secured on the shaft 5. The opposite end of the chain 7. is passed over the plain pulley 13. mounted on the shaft 6. The tumbling lever 14. is secured on the shaft 15. journaled in the carriage 16, and on the opposite end of the said shaft is firmly secured the lever 17. which is provided with the stud-pin 18. which is adapted to accurately fit and freely work in the slot 19. of the connecting rod 20. The lower end of the connecting-rod 20, is pivoted on the pin 21. secured firmly on the swinging end of the traversing-chain grip 22. The chain grip is of a T-form and has its T-ends 23. and 24. curved or bent to the more readily engage and to evenly bear against the rollers 9. of the traversing chain 7; said grip 22, is preferably pivoted on the pin 25 secured on the carriage 16, for the purpose of the more readily engaging and disengaging the chain. A plain bar may be fitted in suitable guides formed in the traversing carriage 16 and caused to move upwardly and downwardly therein to engage and disengage the top or the bottom portions of the traversing chain; but this form is objectionable as the frictional resistance of the guides renders the action of the trip or tumbling lever less sensitive.

The stop rod 26. is secured at its ends to the frames 1. and is provided with the stops 27 adjustably secured thereon by the set screws 28.

The operation of the invention is as follows:—The driving-shaft 5. is rotated by means of its driving pulley 12, thereby rotating the sprocket wheel 11. to traverse the chain 7, continuously in the direction of the arrows "*a*" as shown in Fig. 1. To traverse the carriage 16 in the direction indicated by the arrow *c*, the tumbling or weighted lever 14. is thrown in the direction or position shown in full lines to permit the engaging toe 23 of the grip 22 to engage the bottom portion of the traversing chain 7, by which means the carriage 16 is held in connection with the traversing chain 7. to move it in the direction of the arrow *c*, till the tumbling lever 14, contacts with the stop 27 by which it is moved into the position shown in dotted lines which is the position at which said tumbling lever falls in the inclined position contrary and opposite to that shown in full lines, to cause the top toe 24 of the grip 22, to engage the top portion of the traversing chain 7. to move the carriage 16 in the direction of the top arrow *b*, that is, in a direction contrary and opposite to the direction when the grip 22 engages the bottom portion of the traversing chain 7. The traversing carriage continues to traverse in this direction till the tumbling lever 14. engages or contacts with the stop 27. *b*. by which it is thrown as before to reverse the direction of translation of the sliding carriage 16. In order that the tumbling lever may operate to throw the opposite engaging toes 23. and 24. into engagement alternately with the top and bottom portions of the traversing chain 7. it is necessary that the connecting rod 20. be provided with the slot 19. in which the pin 18. has a sufficient longitudinal play to permit the tumbling lever 14. to fall in position beyond its center of gravity or the center of gravity of the weight thereof before said pin 18 contacts with either the top or bottom ends of said slot 19, to move the grip 22 into upper or lower engagement. Were this slot not provided the carriage would not reverse its movement, but would stop immediately. Either the engaging toes 23. or 24. are disengaged from the traversing chain, there being no other auxiliary force provided to move said lever 14.

The head of the grip 22 has its toes 23. and 24. constructed to just pass between or "clear" the bottom and top portions of the traversing chain 7. when out of engagement; this provision is necessary and it will at once be obvious that the bottom toe 23, must be out of engagement before the top toe 24 is moved into engagement with the traversing chain. It is also necessary at times to disengage the grip 22 entirely and hold it in an intermediate position between the bottom and top portions of said chain for the purpose of maintaining the traversing carriage in a fixed position or holding it at rest. When the grip 22 is entirely out of engagement the traversing carriage 16 may be moved longitudinally in either direction on its guides 2, by hand.

Having thus fully described the nature and operation of my invention, what I claim as new and useful, and desire to cover by Letters Patent of the United States therefor, is—

1. In a traversing mechanism, the combination with a traversing carriage and an endless traversing chain mounted on suitable driving and supporting pulleys, of a chain grip intermediate between the top and bottom portions of said chain, and adapted to engage and to disengage alternately the top and bottom portions of the latter, a connecting rod having its end looped or slotted, a weighted tumbling lever having a shorter pin supporting arm, a pin engaging said slot of the connecting rod, and suitable means for tilting or tumbling said weighted lever, substantially as and for the purpose set forth.

2. In a traversing mechanical movement, the combination with, a suitable traversing carriage, and an endless traversing chain, of a suitable driving chain pulley and a supporting pulley whereon said chain is mounted, a suitable chain grip intermediate between the top and bottom portions of said traversing chain and adapted to engage said top and bottom portions of the chain alternately, a weighted tumbling lever pivoted on said traversing carriage, and having a pin supporting arm, a connecting rod having one of its ends slotted longitudinally and adapted to receive the engaging pin of said pin arm of said weighted tumbling lever, a stop rod and suitable stops adjustably secured thereon, all substantially as and for the purpose set forth.

In testimony whereof I have hereunto set my hand in the presence of two subscribing witnesses.

LOUIS KOSS.

Witnesses:
 THOMPSON R. BELL,
 JOHN H. STEM.